United States Patent [19]

Brandt

[11] Patent Number: 4,655,661
[45] Date of Patent: Apr. 7, 1987

[54] SELF-CUTTING FAST CONSTRUCTION SCREW

[75] Inventor: Horst Brandt, Weiterstadt, Fed. Rep. of Germany

[73] Assignee: Richter-System GmbH & Co. KG, Griesheim, Fed. Rep. of Germany

[21] Appl. No.: 762,153

[22] PCT Filed: Dec. 20, 1984

[86] PCT No.: PCT/EP84/00415

§ 371 Date: Jul. 30, 1985

§ 102(e) Date: Jul. 30, 1985

[30] Foreign Application Priority Data

Dec. 23, 1983 [DE] Fed. Rep. of Germany ....... 3346704

[51] Int. Cl.⁴ .................. F16B 25/02; F16B 25/10
[52] U.S. Cl. .................. 411/387; 408/224; 408/228; 411/399; 411/412; 411/418
[58] Field of Search ............... 411/386, 387, 394, 399, 411/411, 412, 413, 417, 418; 408/224, 225, 227, 228

[56] References Cited

U.S. PATENT DOCUMENTS

| | | | |
|---|---|---|---|
| 3,045,523 | 7/1962 | Reed | 411/387 |
| 3,207,023 | 9/1965 | Knohl | 411/412 X |
| 3,358,548 | 12/1967 | Dyslin | 411/387 |
| 3,786,713 | 1/1974 | Sygnator . | |
| 3,869,219 | 3/1975 | Wilson et al. . | |
| 3,942,405 | 3/1975 | Wagner . | |
| 3,982,464 | 9/1976 | Sygnator . | |
| 4,028,987 | 6/1977 | Wilson | 411/387 |
| 4,034,641 | 7/1977 | Williams et al. | 411/387 |
| 4,064,784 | 12/1977 | Adler | 411/387 |
| 4,275,307 | 8/1981 | Regersburger | 411/387 |
| 4,311,423 | 1/1982 | Hinabayashi | 411/387 |
| 4,347,027 | 8/1982 | Brindle | 411/387 |
| 4,480,951 | 11/1984 | Regensburger | 411/387 |

FOREIGN PATENT DOCUMENTS

| | | | |
|---|---|---|---|
| 696358 | 10/1964 | Canada | 411/387 |
| 2256957 | 5/1974 | Fed. Rep. of Germany | 411/387 |
| 7526601 | 1/1976 | Fed. Rep. of Germany . | |
| 2215359 | 4/1976 | Fed. Rep. of Germany . | |
| 639198 | 5/1962 | Italy | 411/417 |
| 52-14167 | 2/1977 | Japan | 411/399 |
| 13617 | of 1909 | United Kingdom | 411/399 |
| 2,070,996 | 9/1981 | United Kingdom | 411/387 |

Primary Examiner—Thomas J. Holko
Attorney, Agent, or Firm—Burns, Doane, Swecker & Mathis

[57] ABSTRACT

A self-cutting fast construction screw for the fastening of fiber plates to a metal substructure carries on the screw shaft at least one turn of a thread. The screw core passes into a conical drill point. On the conical drill point two cutting edges are arranged in a symmetrical layout, said cutting edges cutting to a diameter located between the diameter of the screw core and the diameter of the outer thread tip. Upon impact on the metal substructure, the two cutting edges break off.

5 Claims, 2 Drawing Figures

SELF-CUTTING FAST CONSTRUCTION SCREW

BACKGROUND AND OBJECTS OF THE INVENTION

The invention concerns a self-cutting fast construction screw to fasten fiber plates to a metal substructure, with a screw shaft carrying at least one turn of a thread and passing over into a conical drilling point, and with two cutting edges located near the end of the shaft and capable of breaking off upon impact on the metal substructure.

To fasten mineral fiber plates and the like to a metal substructure consisting for example of sheet metal supports, customarily self-tapping construction screws are used (DE-OS No. 25 39 365), in which the core of the screw carries a two-turn (or double helix) thread, one turn of which extends to the conical point of the screw. After the penetration of the screw point into the metal substructure, this thread begins to cut a thread.

The screw threads in the mineral fiber plate to be fastened are also formed by the point of the screw, whereby the material is not removed from the bore, but merely displaced laterally. However, for high strength fiber plates solidly pressed of a fibrous material the use of these known construction screws causes problems, as the material to be displaced offers great resistance to the the screw, so that a relatively high axial force must be applied to make the penetration of the fast construction screw into the fiber plate possible. The threads provided for fastening in the metal substructure must pass through the fiber material, so that a finished thread is shaped into the compressed fiber material preventing the establishment of a solid joint between the steel substructure and the fiber material, since the fiber material is already compressed laterally, an appreciable frictional force is generated so that a very high torque must be applied to rotate the construction screw into the material.

In the case of construction screws of the aforementioned type, intended for the fastening of wood panels to a steel substructure, it is known to provide two opposing cutting edges on the lower end of the screw shaft, both of which cut into the wood to the outer diameter of the thread. The cutting edges produce a bore hole in the wood, through which the threads may pass without appreciable friction with the wood. The edges break off upon their impact on the metal. For the mounting of fiber plates made of high strength fibrous materials, however, these known construction screws are not suitable, because here again the drill point would have to produce the entire bore hole to the core diameter of the screw shaft.

It is therefore the object of the invention to develop a fast construction screw of the aforedescribed type that would be suitable for use with fiber plates made of high strength fibrous materials.

SUMMARY OF THE INVENTION

This object is attained according to the invention wherein the two cutting edges are arranged on the conical drill point and are cutting to a diameter located between the diameter of the thread core and the outer diameter of the threads, and that the threading terminates on the screw shaft.

As the two cutting edges are located on the tapering drill point, the drill point must displace the fiber material to a diameter that is appreciably smaller than the diameter of the screw core only. The drill point participates in the cutting and displacement of the fiber material only with its front section protruding past the cutting edge, so that the resistance offered to the drill point is slight. In the rest of the diameter sections on the outside, the two cutting edges effect the cutting of the fiber material.

As the planned fracture line of the two cutting edges is located on the tapering drill point and thus on a diameter that is smaller than the diameter of the screw shaft, the torque required to break off the cutting edges is relatively low; the two cutting edges therefore break off immediately upon their impact on the metal of the substructure. It has been found that the front section of the drill point is narrow and sharp enough to penetrate into the metal under the effect of the axial force applied during the screwing process alone, so that the cutting notches costumarily provided heretofore in the circumferential surface of the drill point are no longer necessary, but they may be additionally provided.

When the drill point penetrates deeper into the metal, it is necessary for the rear zone of the drill point to displace a larger volume of the metal. However, the fracture surfaces of the two broken cutting edges located in that zone, act as cutting notches or edges, so that in that zone the material is displaced not only by the applied axial force to, but at least in part by a cutting or squeezing drilling process.

As there are no cutting edges on the shaft of the screw, the thread or threads (in case of a multiple turn thread) commencing here are not affected by the breaking of a cutting edge or the remaining fracture surface.

In contrast to fast construction screws on which at least one turn of the thread extends onto the conical drill point, in the case of the fast construction screw according to the invention the thread cutting process begins only after the bore in the metal substructure has been produced to the thread shaft diameter.

In a further development of the concept of the invention, the two cutting edges are mounted at the same axial height on the conical drill point. This results in the fact that the torque required for the breaking off of the cutting edges is actuated simultaneously by both of the cutting edges. However, this torque is relatively low, because the onset of the engagement by the cutting edges of the metal substructure and thus the initiation of the fracture are located on a relatively small diameter. The symmetrical layout of the two cutting edges requires a symmetrical action of forces, whereby the fast construction screw is being centered during its penetration into the metal.

Appropriately therefore the two cutting edges have the same radial dimensions so that even during the cutting of the fiber material there are symmetrical forces present, thereby centering the screw.

BRIEF DESCRIPTION OF THE DRAWINGS

The invention is made more apparent below by an example of embodiment shown in the drawing. In the drawing.

DETAILED DESCRIPTION OF A PREFERRED EMBODIMENT OF THE INVENTION

Figures 1, 2:
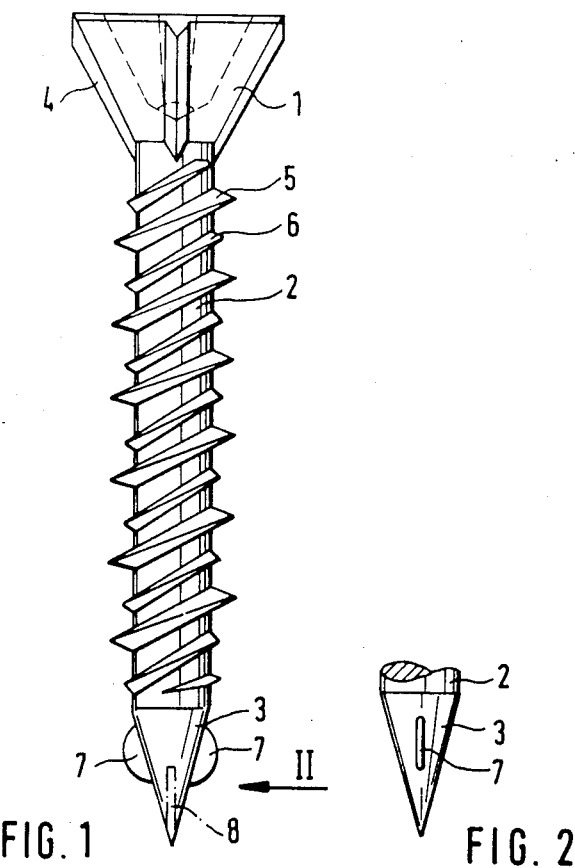
FIG. 1 shows a self-tapping fast construction screw in a lateral elevation and FIG. 2 a partial view in the direction of the arrow II in FIG. 1.

The fast construction screw shown is made of steel and has a screw head 1 in the shape of a truncated cone, a cylindrical screw shaft 2 and a conical drill point 3. The screw head 1 is provided with cross recesses for receiving a tool, and, carries on its conical circumferential surface a plurality of ribs 4 to facilitate the penetration of the screw head 1 into the fiber plate to be fastened, for example a mineral fiber plate.

On the screw shaft 2, two thread turns 5, 6 of different height, are located; they extend to the lower end of the screw shaft 2. The screw is in the form of a two-turn or double helix screw.

On the conical drill point 3, designed with an apex angle of approximately 30°, two cutting edges 7 are mounted at a distance from the point of the screw, on opposing generating lines, said cutting edges being in the form of small, flat tabs with a curved, preferably approximately semicircular outer edge. The two cutting edges 7 are located at the same axial height on the drill point 3 and have the same radial dimensions.

With their curved outer edges the cutting edges 7 cut the material of the mineral fiber plate to a diameter located between the diameter of the thread core (diameter of the screw shaft 2) and the thread point diameter of the higher turn 5. In this manner a bore is produced in the mineral fiber plate into which the shaft of the screw may penetrate without hindrance. The higher thread turn 5 penetrates slightly into the bore wall of the mineral fiber plate and guides the fast construction screw. The lower thread turn 6 touches the bore wall only slightly or not at all.

The two cutting edges 7 are active during the penetration of the mineral fiber plate to be fastened and are cutting a relatively large proportion of the volume of the bore hole to be formed. Only a smaller volume of the bore is produced by the front section of the drill point 3, i.e., the section located in front of the two cutting edges 7.

When the front section of the drill point 3 has penetrated into the metal substructure, the two cutting edges impact the metal and break off. The fracture edges or surfaces produced act during the subsequent penetration of the drill point into the metal as cutting edges or notches.

As indicated in FIG. 1 by a broken line, on the front section of the drill point 3 two opposing cutting notches 8 may be provided, which facilitate the penetration of the drill point 3 into the metal in the case of greater sheet metal thicknesses. The cutting notches 8 are also advantageous in the mounting of asbestos fiber plates or the like. Generally, however, such cutting notches are not necessary.

What is claimed is:

1. A self-cutting construction screw for fastening a fiber plate to a metal substructure, said screw comprising a head, a screw shaft extending from said head and carrying at least one helical thread which terminates on said shaft, a conical drill point extending from an end of said shaft situated opposite said head, said drill point converging in a direction away from said head, and two outwardly projecting frangible cutting edges mounted on said conical drill point for cutting through the fiber plate and breaking off upon impact with the metal substructure, said cutting edges sized to cut to a diameter located between the diameter of the thread core and the outer diameter of the thread.

2. A screw according to claim 1, wherein said head, shaft and drill point define a longitudinal axis, said cutting edges situated at the same longitudinal height on said drill point.

3. A screw according to claim 1, wherein said cutting edges project radially outwardly from said drill point by equal distances.

4. A screw according to claim 1 including cutting notches provided in said conical drill point.

5. A screw according to claim 1, wherein said at least one helical thread comprises a pair of helical threads of different outer diameters.

* * * * *